(12) United States Patent
Karve et al.

(10) Patent No.: US 12,391,224 B2
(45) Date of Patent: Aug. 19, 2025

(54) DRIVER DIRECTIONAL CONTROL DURING BRAKE-TO-STEER MANUAL DRIVING USING MODEL PREDICTIVE CONTROL

(71) Applicants: Steering Solutions IP Holding Corporation, Auburn Hills, MI (US); Continental Automotive Systems, Inc., Auburn Hills, MI (US)

(72) Inventors: Omkar Karve, Farmington Hills, MI (US); Sarin Kodappully, Midland, MI (US); Alexander Jennings, Bath, MI (US); Michael S. Wyciechowski, Grand Blanc, MI (US); Scott T. Sanford, Swartz Creek, MI (US); Iulian Ungureanu, Oakland Township, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 164 days.

(21) Appl. No.: 18/366,371

(22) Filed: Aug. 7, 2023

(65) Prior Publication Data

US 2025/0050850 A1 Feb. 13, 2025

(51) Int. Cl.
*B60T 8/17* (2006.01)
*B60T 8/1755* (2006.01)
(Continued)

(52) U.S. Cl.
CPC ........ *B60T 8/17551* (2013.01); *B60T 8/1706* (2013.01); *B60T 8/17552* (2013.01);
(Continued)

(58) Field of Classification Search
CPC .............. B60T 8/17551; B60T 8/1706; B60T 8/17552; B60T 2230/02; B60T 2250/03;
(Continued)

(56) References Cited

U.S. PATENT DOCUMENTS 10,046,743 B2 8/2018 Jonasson et al.
10,046,749 B2 8/2018 Jonasson et al.
(Continued)

FOREIGN PATENT DOCUMENTS

DE 602004012366 T2 6/2008
DE 102014211061 A1 1/2016
WO WO-2011053304 A1 * 5/2011 ............ B60W 30/02

OTHER PUBLICATIONS

A. Alonso, A. Parra and A. Zubizarreta, "A comparative study on Optimal Control based torque vectoring systems," in 2021 IEEE Vehicle Power and Propulsion Conference (VPPC), 2021.
(Continued)

*Primary Examiner* — Joseph J Dallo
(74) *Attorney, Agent, or Firm* — Ingrassia Fisher & Lorenz, LLP

(57) ABSTRACT

Disclosed is a number of variations that may include a method, system, or computer product useful in determining an intended yaw or yaw rate that a driver desires using a model, comparing the yaw or yaw rate with the actual vehicle yaw or yaw rate to determining a yaw error or yaw rate error, using the yaw error or yaw rate error in a model predictive control to determine the brake pressure required to minimize or reduced to zero the yaw error or the yaw rate error.

15 Claims, 3 Drawing Sheets

(51) Int. Cl.
  B60W 10/04      (2006.01)
  B60W 10/18      (2012.01)
  B60W 30/02      (2012.01)

(52) U.S. Cl.
  CPC ............ B60W 10/04 (2013.01); B60W 10/18 (2013.01); B60W 30/02 (2013.01); *B60T 2230/02* (2013.01); *B60T 2250/03* (2013.01); *B60T 2250/04* (2013.01); *B60T 2270/30* (2013.01); *B60W 2520/14* (2013.01); *B60W 2710/18* (2013.01)

(58) Field of Classification Search
  CPC ............ B60T 2250/04; B60T 2270/30; B60W 10/04; B60W 10/18; B60W 30/02; B60W 2520/14; B60W 2710/18; B60W 2520/10; B60W 2720/14; B60W 10/184; B60W 40/114; B60W 2050/0031
  See application file for complete search history.

(56) References Cited

U.S. PATENT DOCUMENTS

| | | | | |
|---|---|---|---|---|
| 2004/0000814 | A1* | 1/2004 | Bauer | B60T 8/17552 303/146 |
| 2008/0059021 | A1* | 3/2008 | Lu | B60G 17/0195 701/36 |
| 2008/0059034 | A1* | 3/2008 | Lu | B60T 8/17552 701/41 |
| 2008/0082246 | A1* | 4/2008 | Brown | B60T 8/17552 701/91 |
| 2008/0086248 | A1* | 4/2008 | Lu | B60W 40/101 701/41 |
| 2008/0086251 | A1* | 4/2008 | Lu | B60T 8/1755 701/70 |
| 2011/0066325 | A1* | 3/2011 | Lu | B60W 10/184 701/42 |
| 2011/0102166 | A1* | 5/2011 | Filev | B60W 40/09 340/441 |
| 2011/0190985 | A1* | 8/2011 | Billberg | B60W 30/02 701/1 |

OTHER PUBLICATIONS

R. Hajiloo, A. Khajepour, H. Zengin, A. Kasaiezadeh and S.-K. Chen, "A coupled force predictive control of vehicle stability using front/rear torque allocation with experimental verification," Vehicle System Dynamics, vol. 60, No. 7, pp. 2541-2563, 2022.
K. Oh, E. Joa, J. Lee, J. Yun and K. Yi, "Yaw Stability Control of 4WD Vehicles Based on Model Predictive Torque Vectoring with Physical Constraints," International Journal of Automotive Technology, vol. 20, No. 5, pp. 923-932, 2019.
M. Svec, S. Iles and J. Matusko, "Predictive approach to torque vectoring based on Koopman operator," in 2021 European Control Conference (ECC), Rotterdam, 2021.
DE Office action dated Feb. 6, 2024 for DE application No. 10 2023 133 282.1.

* cited by examiner

DRIVER DIRECTIONAL CONTROL DURING BRAKE-TO-STEER MANUAL DRIVING USING MODEL PREDICTIVE CONTROL

TECHNICAL FIELD

The field to which the disclosure generally relates to includes vehicle steering and braking control.

BACKGROUND

Some methods used in a vehicle to determine brake pressures required to achieve an intended yaw control depend upon traditional methods such as pressure tables based on velocity and lateral acceleration, such methods do not actively reduce yaw error in terms of yaw movement that the driver desires the vehicle to make.

SUMMARY OF ILLUSTRATIVE VARIATIONS

A number of variations may include a method, system, or computer product useful in determining an intended yaw or yaw rate that a driver desires using a model, comparing the yaw or yaw rate with the actual vehicle yaw or yaw rate to determining a yaw error or yaw rate error, using a model predictive control to determine the brake pressure required to minimize or reduced to zero the yaw error or the yaw rate error.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
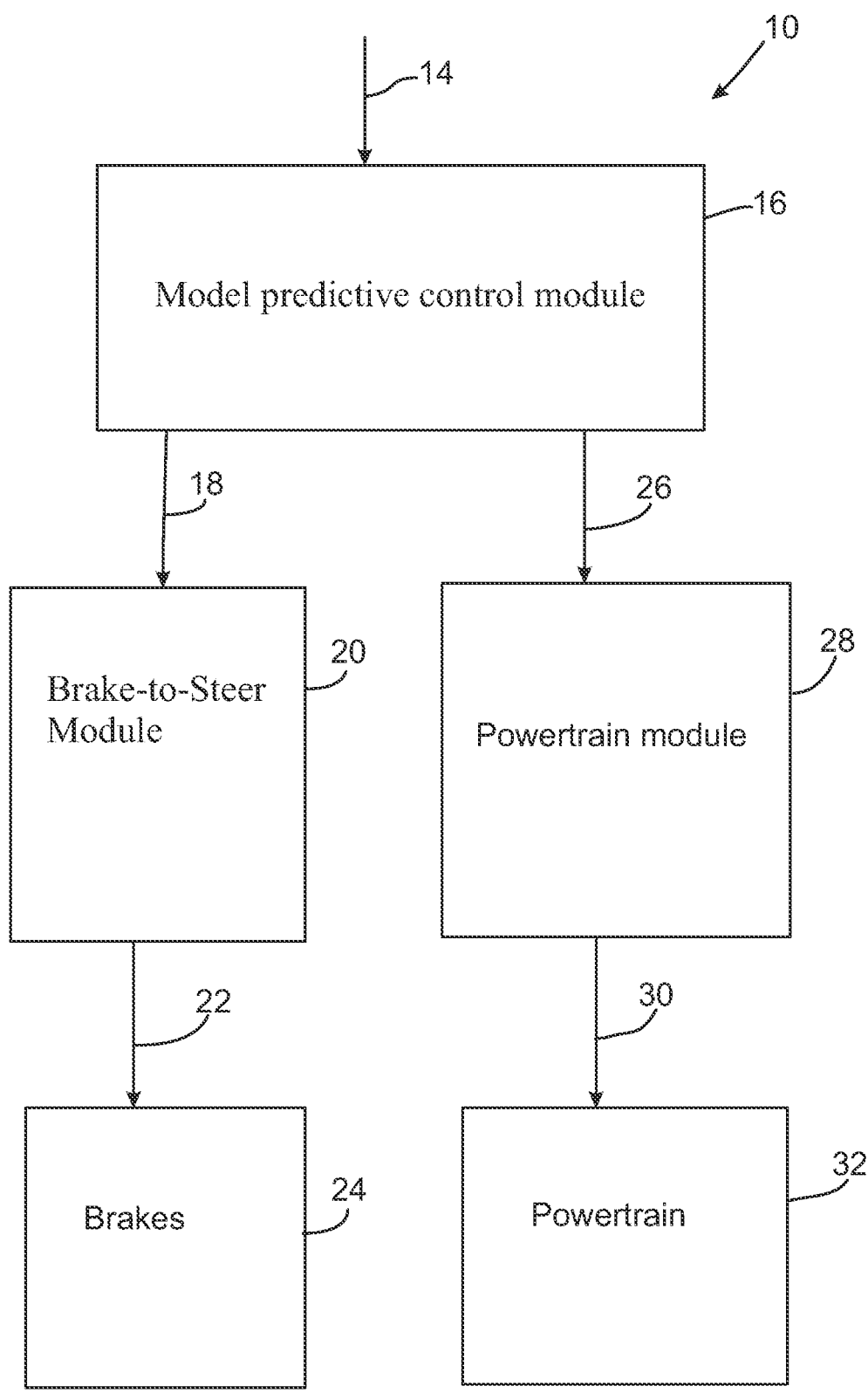
FIG. 1 illustrates a method and system according to a number of variations.

The following description of the variations is merely illustrative in nature and is in no way intended to limit the scope of the invention, its application, or uses.

A number of variations may use a vehicle equipped with electrical power assisted steering system having either traditional system with an intermediate connecting shaft between column and steering rack or a steer by wire system, the steering system can fail either electrically or mechanically. In these cases, the driver can utilize brake-to-steer (BTS) to achieve lateral control of the vehicle. Lateral control of the vehicle may be achieved using differential braking, for example, but not limited to, when using a brake by wire system. However, the methods, systems, and computer products described herein may use model predictive control to determine brake pressure and or powertrain commands even when components of the vehicle have not failed.

In case of connected steering system that has failed, the driver inputs a torque in the steering wheel which then drives the steering rack causing a yaw movement of the vehicle along with certain lateral acceleration. This yaw rate thus achieved will be less than normal yaw rate for a system that has full primary steering system that is functional. In a number of variations, the ideal yaw rate can be estimated by using the vehicle velocity/lateral acceleration and/or a predictive bicycle model or by characterizing the vehicle. The ideal yaw rate can then be compared to actual yaw rate. The error thus calculated may be passed to a Model Predictive Control (MPC) block or module that will use a state-space based representation of the vehicle operating a BTS system to predict the best set of brake pressures on all wheels to achieve a zero yaw rate error or minimize the yaw rate error.

In case of a steer by wire system method described above for a mechanically connected steering system will be the same except, the driver is unable to induce any yaw in the vehicle because the steering column is not mechanically connected to the steering rack and the steering rack has failed. In this case the predicted yaw can be estimated from a steering column angle sensor as an input parameter to the vehicle velocity/lateral acceleration and/or a predictive bicycle model or by characterizing the vehicle. This method can also be used in connected systems where an external/redundant column angle (steering angle) sensor is available.

The bicycle model takes a 4-wheel model and combines the front and rear wheels respectively to form a two-wheeled model (hence the name bicycle model). MPC helps the vehicle to predict and plan for future events by continuously generating a series of control actions that will get the vehicle closer to its desired trajectory. MPC algorithm can handle non-linear and complex vehicle dynamics like tire force models and actuator models, allowing precise and accurate trajectory tracking. At each timestamp, the MPC receives the measured outputs to predict the current states. Then it computes the series of control inputs, which minimizes the cost over the prediction horizon by solving a constrained optimization problem. The optimization problem relies on the vehicle model, references and the current state. Eventually, the MPC controller or module applies the first computed control input to the vehicle, ignoring the following ones. The process repeats for the following timestamps. Stated in another way, MPC predicts the control inputs over the prediction horizon, in a way that the predicted output will merge with the reference trajectory. Then, MPC uses the predicted control input at the then present time only for actuation.

FIG. 1 illustrates a system and method 10 which may include a model predictive control module 16 which receives vehicle data 14 which may include, but not limited to, steering angle, yaw, yaw rate, vehicle speed or velocity, wheel speed, lateral acceleration, brake pressure at individual vehicle roadwheels, and/or powertrain data or commands. The model predictive control module uses vehicle data 14 to predict and plan for future events by continuously generating a series of control actions that will get the vehicle closer to its desired trajectory intended by a driver which may be determined based on the vehicle data 14. For example, the model predictive control module may use an algorithm for determining an intended yaw or yaw rate that a driver desires using a model, which may be based on vehicle speed or velocity and lateral acceleration, or based upon a bicycle model, or other characterization of the vehicle, the model predictive control module carries out a method which may include comparing the driver intended yaw or yaw rate with the actual vehicle yaw or yaw rate to determine a yaw error or yaw rate error. Thereafter, the model predictive control module uses the yaw error or yaw rate error to determine the brake pressure to minimize or reduced to zero the yaw error or the yaw rate error. The model predictive control module may send brake pressure commands 18 to a brake-to-steer module 20 which may use the brake pressure commands along with other vehicle data to send a second set of commands 22 to individual brakes 24 to steer the vehicle or assist in a steering the vehicle. The model predictive control module 16 may also determine powertrain or propulsion commands 26 which may be sent to a powertrain module 28 which may use the powertrain or propulsion commands 26 along with other vehicle data to send a second set of powertrain commands 30 to a powertrain system 32. Alternatively, brake pressure commands 18 may be sent directly to the brakes 24, and powertrain commands 26 may be sent directly to a powertrain system 32.

Figure 2:
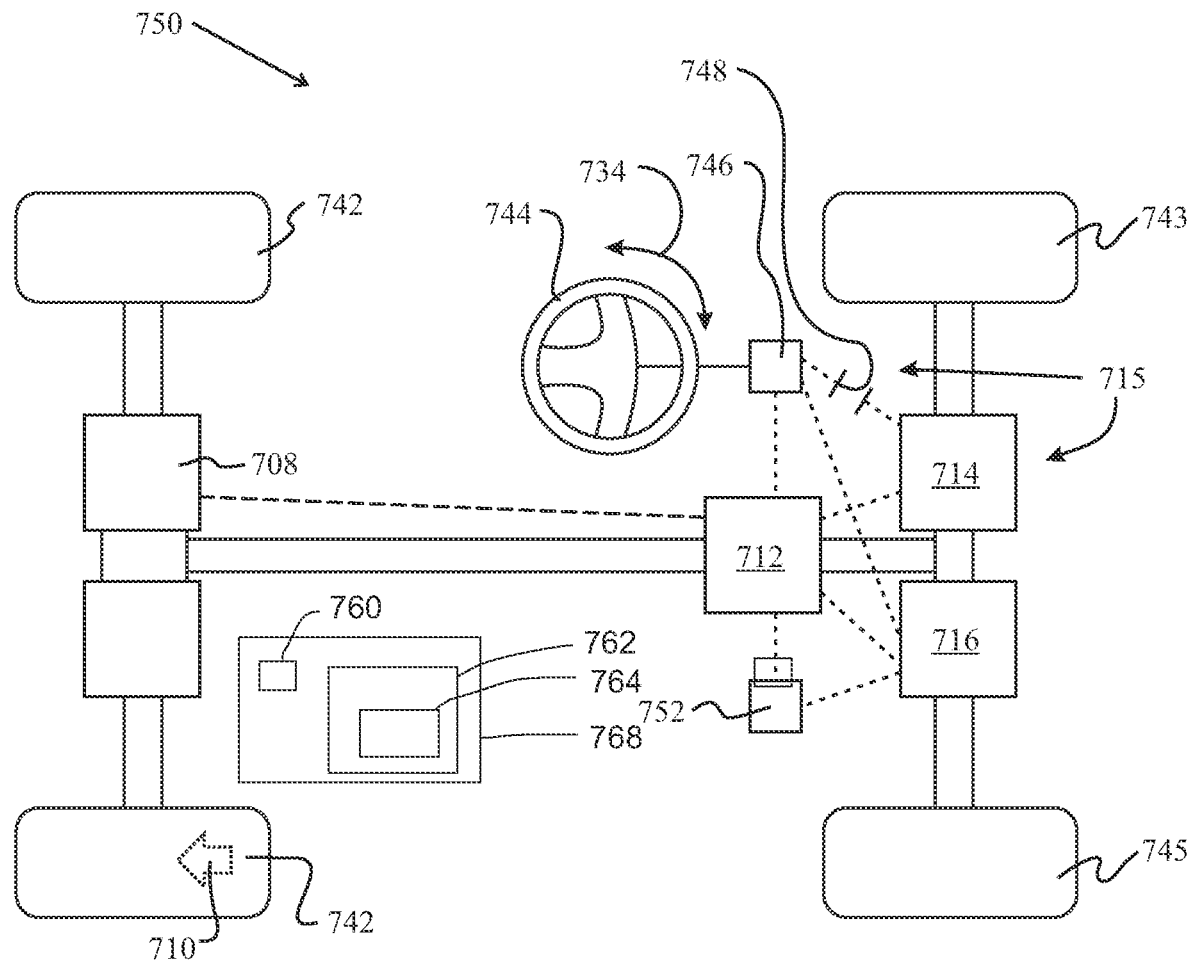
FIG. 2 depicts an illustrative variation of a system and vehicle with a steer-by-wire system.
Figure 3:
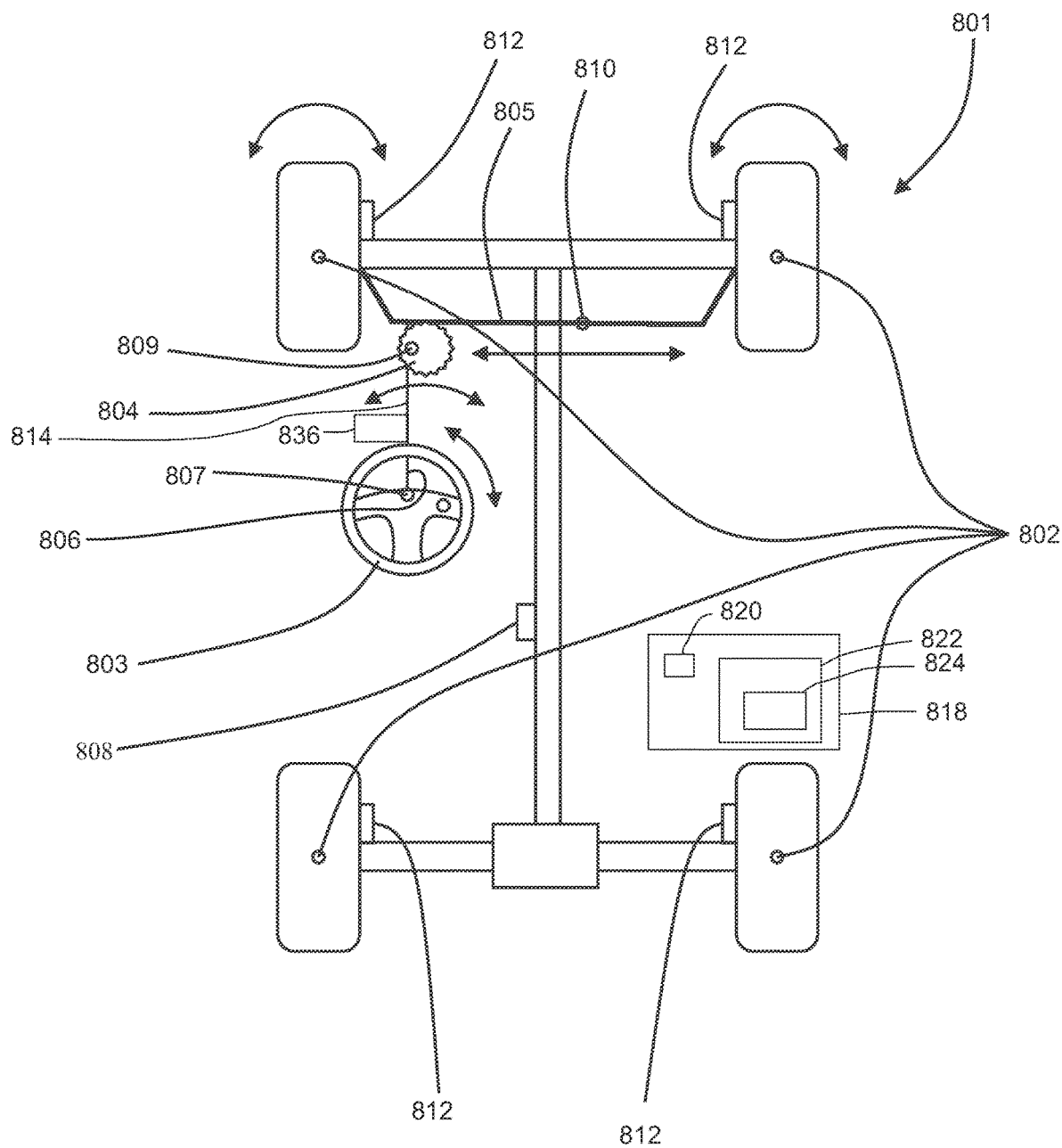
FIG. 3 depicts an illustrative variation of a system and a vehicle with a connected power steering system.

FIG. 2 illustrates a vehicle having steer-by-wire functionality and a system for carrying out method described herein. FIG. 3 illustrates a vehicle with a mechanical steering linkage and a system for carrying out method described herein. The components and systems of FIGS. 2 and 3 may be interchanged provided that the vehicle in FIG. 2 retains steer-by-wire functionality and the vehicle in FIG. 3 retains a mechanical steering linkage.

FIG. 2 depicts an illustrative variation of various portions of a vehicle equipped with hardware sufficient for carrying out at least some of the systems and methods described herein. A vehicle 750 may include a controller 712 constructed and arranged to provide Brake-to-Steer functionality in a vehicle 750. The controller 712 may be in operable communication with a steer-by-wire system 715, and an electronic braking system 716. The steer-by-wire system 715 may be composed of handwheel actuator 746 and roadwheel actuator 714. The steer-by-wire system 715 may be constructed and arranged to turn at least one road wheel 742. The electronic braking system 716 may apply brake force or brake torque 710 to determine appropriate roadwheels 742. A driver may utilize a handwheel 744 including at least one handwheel actuator 746 to provide driver input 734 for lateral movement and send steering commands to the steer-by-wire system 715 and roadwheel actuator 714. The electronic braking system 716 may be in operable communication with the controller 712 and a driver braking input system 752, such as a brake pedal system, to receive driver braking input. According to some variations, the handwheel actuator 746 may be in operable communication with the controller 712, the steer-by-wire roadwheel actuator 714, or the electronic braking system 716. In some variations, the handwheel actuator 746 may be disconnected or in a failure state 748 from or unable to communicate with the steer-by-wire roadwheel actuator 714. In such a variation, the handwheel actuator 746 may communicate steering commands to the controller 712, which may receive steer-by-wire system 715 health status information. Where the controller 712 has received steer-by-wire system 715 information indicative of steer-by-wire system 715 failure 748 or roadwheel actuator 714 failure, the controller 712 may convert steering commands from the handwheel actuator 746 to brake force or brake torque commands to be communicated to the electronic braking system 716. Controller 712 may include instructions that may include an algorithm to carryout MPC. The electronic braking system 716 may apply brake force or brake torque 710 to determined appropriate roadwheels 742 to effectuate lateral movement of the vehicle as input 734 by the driver via the handwheel 744. Controller 712 may also send powertrain commands to a powertrain system 708. Control 712 and any other control, for example controller 768, may be provided to carry out one or more functions described herein and may include a processor 760, memory 762, wherein the instructions 764 stored in the memory 762 are executable by the processor 760.

Referring now to FIG. 3, an illustrative variation of a vehicle equipped with hardware that allows it to carry out at least some of the methods disclosed herein is shown. A vehicle 801 is equipped with roadwheels 802 and a handwheel 803 for turning the roadwheels 802 via a pinion 804 that engages a rack 805 that is constructed and arranged to turn the roadwheels 802. In the illustrative variation shown, the handwheel 803 is equipped with a hand wheel torque sensor 806 and a hand wheel angle sensor 807 so that any turning of the handwheel may produce sensor data that may be communicated to or accessed by a controller 808. Controller 808 may provide all other functionality described herein including MPC, steer-by-wire control, powertrain control, braking control, and/or control a vehicle system, or one or more other controllers may be provided to do the same. Although, in this illustrative variation, the controller 808 is shown onboard the vehicle, the controller may also be located somewhere apart from the vehicle and communicate with wirelessly by the sensors or the vehicle. Pinion 804 may be equipped with a pinion torque sensor 809 so that any turning of the pinion may be observed by or communicated to the controller 808 and utilized by the methods described herein. In the illustrative variation shown, rack 805 is equipped with a rack force sensor 810 so that any rack forces detected during driving may be observed by or communicated to the controller 808 and utilized by the methods described herein. The vehicle may have a steering shaft 814 connecting the steering wheel or steering interface 803 to pinion 804. An electric power steering assist or hydraulic power steering device 836 may be connected to the shaft 814 to assist the driver in steering the roadwheels of the vehicle by reducing the force or torque the driver would need to apply to the steering wheel or steering interface 803 if the power steering device 836 was not present. Also shown in this illustrative variation, the roadwheels 802 may be equipped with roadwheel sensors so that any roadwheel data detected during driving may be observed by or communicated to the controller 808 and utilized by the methods described herein. Additionally, in the illustrative variation shown, brakes 812 are located near roadwheels 802. Another controller 818 may be provided and may include a processor 820, memory 822, wherein the instructions 824 stored in the memory 822 are executable by the processor 820 to determine if the hand wheel angle sensor 807 or if the pinion 804, rack 805, pinion sensor 809, or rack sensor 810 have failed. Furthermore, wherein the instructions 824 stored in memory 822 are executable by the processor 820 to carry out any of the methods or achieve any functionality described herein.

Modules and controllers described herein may include software, hardware, or a computing device including non-transitory computer readable medium, such as but not limited to memory, having instructions stored there on, and a processor for executing the instructions to perform the acts, steps, methods and functionality described herein. Multiple modules and controllers and their associated acts, steps, methods, and functionality may be contained in or achieved by one or more computing devices.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method including determining an intended yaw or yaw rate that a driver desires using a model; comparing the intended yaw or yaw rate with the actual vehicle yaw or yaw rate to determine a yaw error or yaw rate error; using the determined yaw error or yaw rate error in a model predictive control module to determine the brake pressure to minimize or reduced to zero the yaw error or the yaw rate error.

Variation 2 may include a method as set forth in Variation 1 wherein the model is a vehicle bicycle model.

Variation 3 may include a method as set forth in Variation 1 wherein the model is based on vehicle velocity and lateral acceleration.

Variation 4 may include a method as set forth in Variation 1 further comprising sending brake commands based on the determined brake pressure to minimize or reduced to zero the yaw error or the yaw rate error.

Variation 5 may include a method as set forth in Variation 1 further comprising sending powertrain commands to achieve the intended yaw or yaw rate.

Variation 6 may include a computer readable medium comprising non-transitory memory operable for machine instructions that are to be executed by an electronic processor, the instructions when executed by the electronic processor implement the following functions including determining an intended yaw or yaw rate that a driver desires using a model; comparing the intended yaw or yaw rate with the actual vehicle yaw or yaw rate to determine a yaw error or yaw rate error; using the determined yaw error or yaw rate error in a model predictive control module to determine the brake pressure to minimize or reduced to zero the yaw error or the yaw rate error.

Variation 7 may include a computer readable medium as set forth in Variation 6 wherein the model is a vehicle bicycle model.

Variation 8 may include a computer readable medium as set forth in Variation 6 wherein the model is based on vehicle velocity and lateral acceleration.

Variation 9 may include a computer readable medium as set forth in Variation 6 further comprising sending brake commands based on the determined brake pressure to minimize or reduced to zero the yaw error or the yaw rate error.

Variation 10 may include a computer readable medium as set forth in Variation 6 further comprising sending powertrain commands to achieve the intended yaw or yaw rate.

Variation 11 may include a system including a predictive model control module, wherein the predict model control model includes non-transitory memory with instruction stored thereon and executable by an electronic processor to carry out the acts of: receiving vehicle data and determining from the data an intended yaw or yaw rate that a driver desires using a model; comparing the intended yaw or yaw rate with the actual vehicle yaw or yaw rate to determine a yaw error or yaw rate error; using the determined yaw error or yaw rate error to determine the brake pressure to minimize or reduced to zero the yaw error or the yaw rate error.

Variation 12 may include a system as set forth in Variation 11 wherein the predictive model control module uses a vehicle bicycle model.

Variation 13 may include a system as set forth in Variation 11 wherein the predictive model control module uses vehicle velocity and lateral acceleration.

Variation 14 may include a system as set forth in Variation 11 further comprising sending brake commands based on the determined brake pressure to minimize or reduced to zero the yaw error or the yaw rate error to a brake-to-steer module.

Variation 15 may include a system as set forth in Variation 11 further comprising sending powertrain commands to a powertrain module to achieve the intended yaw or yaw rate.

The above description of select examples of the invention is merely illustrative in nature and, thus, variations or variants thereof are not to be regarded as a departure from the spirit and scope of the invention.

What is claimed is:

1. A method comprising:
providing a vehicle having roadwheels, a steer-by-wire system having a roadwheel actuator, a handwheel for turning the roadwheels connected to the roadwheel actuator, the handwheel including a handwheel actuator to receive steering input from a driver of the vehicle, an electronic brake system, and an electronic controller having written instructions to convert steering commands from the handwheel actuator to brake force or brake torque commands;
receiving, by the electronic controller, steering commands from the handwheel actuator;
determining, by the electronic controller, an intended yaw or yaw rate of a driver of the vehicle, based on the steering input from the driver to the handwheel actuator, using a model;
comparing, by the electronic controller, the intended yaw or yaw rate with the actual vehicle yaw or yaw rate to determine a yaw error or yaw rate error;
using, by the electronic controller, the determined yaw error or yaw rate error in a model predictive control module to determine the brake pressure to minimize or reduced to zero the yaw error or the yaw rate error;
sending, by the electronic controller, the brake force or brake torque commands to the electronic brake system to apply the determined brake pressure.

2. A method as set forth in claim 1 wherein the model is a vehicle bicycle model wherein the bicycle model takes a 4-wheel model and combines the front and rear wheels respectively to form a two-wheeled model.

3. A method as set forth in claim 1 wherein the model is based on vehicle velocity and lateral acceleration.

4. A method as set forth in claim 1 wherein the model is a predictive bicycle model that takes a 4-wheel model and combines the front and rear wheels respectively to form a two-wheeled model.

5. A method as set forth in claim 1 further comprising sending powertrain commands to achieve the intended yaw or yaw rate.

6. A computer readable medium comprising non-transitory memory operable for machine instructions that are to be executed by an electronic processor, the instructions when executed by the electronic processor implement the following functions comprising:
receiving steering commands from a handwheel actuator of a steer-by-wire steering system;
determining an intended yaw or yaw rate of a driver of the vehicle, based on handwheel actuator input by the driver, using a model;

comparing the intended yaw or yaw rate with the actual vehicle yaw or yaw rate to determine a yaw error or yaw rate error;

using the determined yaw error or yaw rate error in a model predictive control module to determine the brake pressure to minimize or reduced to zero the yaw error or the yaw rate error.

7. A computer readable medium as set forth in claim 6 wherein the model is a vehicle bicycle model.

8. A computer readable medium as set forth in claim 6 wherein the model is based on vehicle velocity and lateral acceleration.

9. A computer readable medium as set forth in claim 6 further comprising sending brake commands based on the determined brake pressure to minimize or reduced to zero the yaw error or the yaw rate error.

10. A computer readable medium as set forth in claim 6 further comprising sending powertrain commands to achieve the intended yaw or yaw rate.

11. A vehicle comprising:
roadwheels, a steer-by-wire system having a roadwheel actuator, a handwheel for turning the roadwheels connected to the roadwheel actuator, the handwheel including a handwheel actuator, an electronic brake system to apply brake force or brake torque to the roadwheels, and an electronic controller including an electronic processor;
a predictive model control module, wherein the model predictive control model includes non-transitory memory with instruction stored thereon and executable by the electronic processor to carryout the acts of:
receiving vehicle data and determining from the data an intended yaw or yaw rate of a driver of the vehicle, based on handwheel actuator input from the driver, using a model;

comparing the intended yaw or yaw rate with the actual vehicle yaw or yaw rate to determine a yaw error or yaw rate error;

using the determined yaw error or yaw rate error to determine the brake pressure to minimize or reduced to zero the yaw error or the yaw rate error;

sending brake force or brake torque commands, by the electronic control, to the electronic brake system to apply the determined brake pressure.

12. A system as set forth in claim 11 wherein the predictive model control module uses a vehicle bicycle model that takes a 4-wheel model and combines the front and rear wheels respectively to form a two-wheeled model.

13. A system as set forth in claim 11 wherein the predictive model control module uses vehicle velocity and lateral acceleration.

14. A system as set forth in claim 11 further comprising sending brake commands based on the determined brake pressure to minimize or reduced to zero the yaw error or the yaw rate error to brake-to-steer module.

15. A system as set forth in claim 11 further comprising sending powertrain commands to a powertrain module to achieve the intended yaw or yaw rate.

* * * * *